US011643510B2

(12) United States Patent
Vos

(10) Patent No.: US 11,643,510 B2
(45) Date of Patent: May 9, 2023

(54) METHOD FOR PRODUCING A PIGMENTED POLYMER MATERIAL

(71) Applicant: TRIPLEDATT, Leuven (BE)

(72) Inventor: Hendré Vos, Leuven (BE)

(73) Assignee: SMART COLORING GMBH, Aachen (DE)

( * ) Notice: Subject to any disclaimer, the term of this patent is extended or adjusted under 35 U.S.C. 154(b) by 1077 days.

(21) Appl. No.: 16/334,771

(22) PCT Filed: Sep. 22, 2017

(86) PCT No.: PCT/EP2017/074034
§ 371 (c)(1),
(2) Date: Mar. 20, 2019

(87) PCT Pub. No.: WO2018/055088
PCT Pub. Date: Mar. 29, 2018

(65) Prior Publication Data
US 2019/0233597 A1 Aug. 1, 2019

(30) Foreign Application Priority Data
Sep. 22, 2016 (EP) .................................... 16190216

(51) Int. Cl.
C08J 3/20 (2006.01)
B41M 1/30 (2006.01)
B41M 5/52 (2006.01)
D06P 5/20 (2006.01)
D06P 5/30 (2006.01)
B41M 5/00 (2006.01)
B32B 27/00 (2006.01)
C08K 3/013 (2018.01)
C08J 3/205 (2006.01)
C08J 3/28 (2006.01)
C08J 5/18 (2006.01)
D06P 3/24 (2006.01)
D06P 3/52 (2006.01)
D06P 3/79 (2006.01)
B41M 5/50 (2006.01)
(Continued)

(52) U.S. Cl.
CPC ............. *C08J 3/201* (2013.01); *B32B 27/00* (2013.01); *B41M 1/30* (2013.01); *B41M 5/0011* (2013.01); *B41M 5/0064* (2013.01); *B41M 5/5218* (2013.01); *B41M 5/5254* (2013.01); *B41M 5/5263* (2013.01); *C08J 3/2053* (2013.01); *C08J 3/28* (2013.01); *C08J 5/18* (2013.01); *C08K 3/013* (2018.01); *D06P 5/2066* (2013.01); *D06P 5/2072* (2013.01); *D06P 5/2077* (2013.01); *D06P 5/2083* (2013.01); *D06P 5/30* (2013.01); *B41M 5/0047* (2013.01); *B41M 5/508* (2013.01); *B41M 7/009* (2013.01); *B41M 7/0081* (2013.01); *C08J 2323/12* (2013.01); *C08J 2323/16* (2013.01); *C08J 2347/00* (2013.01); *C08J 2423/06* (2013.01); *C08L 33/02* (2013.01); *C08L 33/068* (2013.01); *C08L 33/10* (2013.01); *C08L 77/00* (2013.01); *D06P 3/24* (2013.01); *D06P 3/52* (2013.01); *D06P 3/79* (2013.01)

(58) Field of Classification Search
CPC ............ C08J 3/201; C08J 3/2053; C08J 3/28; C08J 5/18; C08J 2323/12; C08J 2323/16; C08J 2347/00; C08K 3/013; B32B 27/00; B41M 1/30; B41M 5/0011; B41M 5/0064; B41M 5/5218; B41M 5/5254; B41M 5/5263
See application file for complete search history.

(56) References Cited

U.S. PATENT DOCUMENTS 4,059,471 A  11/1977 Haigh
4,320,046 A   3/1982 Havens
(Continued)

FOREIGN PATENT DOCUMENTS

EP    0207205 A2    1/1987
WO    WO9746367 A1  12/1997
(Continued)

OTHER PUBLICATIONS

International Search Report for PCT/EP2017/074034; International Filing Date: Sep. 22, 2017.
Written Opinion for PCT/EP2017/074034; International Filing Date: Sep. 22, 2017.
International Preliminary Report on Patentability for International Application No. PCT/EP2017/074034, dated Apr. 4, 2019.
Textile Chemist and Colorist, vol. 24, No. 7, Jul. 1992.

*Primary Examiner* — Edward J Cain
(74) *Attorney, Agent, or Firm* — Schmeiser, Olsen & Watts, LLP

(57) ABSTRACT

Provided is a method for dyeing a polymer material with an aqueous pigment composition containing at least one pigment dispersed therein, wherein the polymer material is a blend including a first polymer composition and a second polymer composition which is compatible with the first polymer composition, which second polymer composition includes a binding agent for the at least one pigment. The method includes the steps of heating the polymer material to an activation temperature below the softening temperature of the polymer material, contacting the polymer material with the aqueous pigment composition at a contact temperature for a period of time sufficient to form a pigmented polymer material, subjecting the pigmented polymer material to a fixation step to fixate the at least one pigment therein by cooling the pigmented polymer material to a fixation temperature which is lower than the temperature at which contacting of the polymer material with the aqueous pigment composition is carried out.

30 Claims, No Drawings

(51) Int. Cl.
  *B41M 7/00* (2006.01)
  *C08L 33/02* (2006.01)
  *C08L 33/06* (2006.01)
  *C08L 33/10* (2006.01)
  *C08L 77/00* (2006.01)

(56) References Cited

U.S. PATENT DOCUMENTS

| | | |
|---|---|---|
| 9,376,582 B1 | 6/2016 | Dannhauser et al. |
| 2007/0182053 A1* | 8/2007 | Hoellein ............ C08J 3/201 |
| | | 264/141 |
| 2009/0039543 A1 | 2/2009 | Sierakowski et al. |
| 2010/0035497 A1 | 2/2010 | Sierakowski et al. |

FOREIGN PATENT DOCUMENTS

| | | |
|---|---|---|
| WO | WO2004091926 A1 | 10/2004 |
| WO | WO2011128669 A1 | 10/2011 |
| WO | WO2015195073 A1 | 12/2015 |

* cited by examiner

METHOD FOR PRODUCING A PIGMENTED POLYMER MATERIAL

CROSS-REFERENCE TO RELATED APPLICATIONS

This application claims priority to PCT Application No. PCT/EP2017/074034, having a filing date of Sep. 22, 2017, based on EP 16190216.8, having a filing date of Sep. 22, 2016, the entire contents both of which are hereby incorporated by reference.

FIELD OF TECHNOLOGY

The following relates to dyeing a polymer material with an aqueous pigment composition containing at least one pigment dispersed therein, wherein the polymer material is a blend comprising a first polymer composition and a second polymer composition which is compatible with the first polymer composition, which second polymer composition comprises a binding agent for the at least one pigment. The following relates in particular to a method for producing a dyed polymer material, for example in the form of dyed fibers, dyed sheets or films, or a dyed solid material part. The following also relates to a printed polymer sheet and to a dyed printed polymer sheet, in particular a polymer sheet which is suitable for use with and is capable of conforming to the shape of three-dimensional objects having any arbitrary shape and thereby maintain the quality of the print on the entire printed surface.

BACKGROUND

The use of printed films as a packaging material for different types of goods, such as food and non-food articles are known. When used with food, it is always a challenge to minimize the risk that components present in the ink would migrate through the film and end up into the food.

The use of printed films for applying a desired image to a three-dimensional object is known as well. WO97/46367 for example discloses a process for producing a so-called synthetic paper, this is a biaxially oriented polymer film of one or more layers with a thickness of up to 250 microns, wherein the polymer film contains a high proportion of filler and/or pigment at least in the surface layer to be printed. The process disclosed in WO97/46367 comprises the steps of
  (a) extruding a melt comprising a mixture of at least one crystallizable film-forming polymer, pigments, fillers, or both pigments and fillers, and optionally an additive, through one or more slot dies; the temperature is maintained between the primary film's solidifying point and a temperature required for biaxial orientation process step (c) in such a manner that the primary film is never cooled to a temperature below that required for biaxial orientation
  (b) allowing the extruded melt to solidify into a primary film having pigments, fillers, or both pigments and fillers, embedded therein while controlling the temperature and thickness of the resultant primary film to a degree of crystallization required for subsequent processing;
  (c) biaxially orienting the primary film and cooling the film, thereby obtaining a biaxially oriented film having one or more layers.

The length of time between solidification and stretching is selected so that that crystallization of the film-forming polymer between the filler and pigment particles embedded in it, is essentially completed before stretching is carried out.

However, as the printed image is usually applied on an outer, used face of the film, it is subject to wearing and will be prone to being damaged during use. The risk to damaging of the film may be minimized by application of a protective, transparent coating on top of the printed image. This however requires an additional process step and the presence of the coating risks to adversely affect the quality of the print. The alternative, where the printed image is applied to the face of the film that is adhered to the object, usually leads to inferior quality of the print.

The skilled person is aware of the problems associated with the dying of polymers in particular polyolefins, more in particular polypropylene, which as a consequence of its high hydrophobicity, shows little or no affinity for inorganic pigments or organic pigments or dyes with a somewhat more polar structure. As a result, printing or dyeing of polypropylene films, foils or sheets by contacting the polypropylene fibers with an aqueous ink, often leads to bad ink adhesion, risk of poor dye substantivity, pale coloring and high risk of ink transfer problems. To solve these problems, a variety of solutions have been provided.

It has for example been proposed to subject the surface of polypropylene material to firing or corona pre-treatment, as a result of which a polar surface is created, which may be dyed or decorated using the known techniques. Upon ageing of the material, this effect may however disappear partly or fully.

WO2011/128669 discloses a coextruded inherently printable multi-layer facestock film for labels having a substrate core layer comprising a polyolefinic material, to which at least one skin layer of less than 5-micron thickness has been applied, which comprises a copolyester with a low degree of crystallinity which is ink printable. Although a tie layer of a modified polyolefin is applied between the core layer and the at least one skin layer, the film still suffers from delamination.

U.S. Pat. No. 4,059,471 discloses interposing a polyolefin carrier between a transfer web containing dispersed dyes and a dye receptor plastic web, pressing the webs together, heating the pressed webs to a sublimation temperature for the dyes, cooling the webs below the softening temperature of the dye receptor web and separating the dye receptor web from the other webs. As dye transfer web use is made of for example polyolefins, polyethylene, polypropylene. Polyethylene is said to allow transmission of sublimated dyes without significant adsorption or distortion of the dye. Suitable dye receptors include polycarbonates, vinyls, acrylics, polystyrene, ABS etc.

WO2004/091926 discloses a recording paper ready for printing, which comprises a carrier as a supporting structure of the paper and an absorption layer of molten polymer material spread on top of the carrier by extrusion coating. An intermediate layer positioned in between the absorption layer and the carrier also formed from plastic in a molten state in the same extrusion coating stage, attaches the absorption layer to the carrier. During printing with a water-based ink, the inks mainly remain on the surface layer on top of the absorption layer. Water acting as a solvent penetrates the absorption layer. As the ink is drying the water may flow back to the surface. The absorption layer is made of a thermoplastic hydrophilic compound, containing polyvinyl alcohol and between 20 and 50 wt. % of fine-grained inorganic pigments for improving the drying speed and increasing absorbency during printing.

The composition of the printing films described above provided to modify polypropylene to improve its printability, however have quite complex structure. Moreover, in the printing films described above, the ink is applied to and remains on an external, accessible surface of the printing film, and is therefore vulnerable to scratching and other mechanical damaging unless a coating is applied on top of the ink. This however requires an additional process step.

There is thus a need to a polymer film, which may be printed with a printed image, wherein the printed image shows a good resistance to wearing without requiring the use of a protective coating to protect the print.

U.S. Pat. No. 9,376,582 B1 discloses a method of printing with water-based inkjet inks on a water-impermeable, low-surface-energy substrate, for example polyesters, polyimides, polycarbonates, polystyrenes, polyolefins, polyurethanes, polyvinyl acetates, polyvinyl chlorides, polyvinylidene chlorides, and copolymers. The method comprises the steps of:
  a) modifying surface properties of the water-impermeable, low-surface-energy substrate to increase the surface energy and make it receptive to a water-based coating composition;
  b) coating the modified surface of the water-impermeable, low-surface-energy substrate with a water-based tie-layer composition of a polyethyelene imine, epoxy resin, polyvinyl alcohol or polyurethane,
  c) coating over the first layer with a second layer comprising a water-based ink-receptive composition comprising: a water-soluble multivalent metal salt; and a hydrophilic binder polymer;
  d) depositing on the surface of the second layer one or more water-based ink compositions containing an anionically stabilized pigment colorant with an inkjet deposition system;
  e) drying the first and second coated layers and the deposited inks to remove the water; and
  f) post-coating the dried ink layers and any exposed first and second layers with one or more functional compositions to form a multi-layered structure.

Depositing several layers on top of each other and causing them to dry is complicated, labor intensive and involves an additional material cost.

WO2015/195073 discloses a printable recording media, comprising: a substrate which is coated with a coating layer of a mixture of (1) 50-95 wt. %, 70-95 wt. % with respect to the weight of the coating layer of a first polymer selected from the group of a polymer comprising ethylene residues and vinyl alcohol residues, a polymer comprising vinyl alcohol residues; and 5-30 wt. % of a second polymer which is a terpolymer of ethylene, ethyl acrylate and maleic anhydride. The substrate further comprises a tie layer made of polymers that comprise butyl acrylate residues, maleic anhydride residues and ethylene residues. The substrate is a composition comprising polyolefins, polyesters, polyurethanes, polyvinyl chlorides, polyamides, polystyrene, ethylene vinyl alcohol, poly lactic acid, cellulose. In a method for producing this printable recording media a coating layer is extruded to one or both sides of the substrates, wherein the coating layer includes a mixture of the first and second polymer. The fact that the coating layer is produced in a separate step complicates the production process. Moreover, the inventors have observed that the printed image is insufficiently stable and shows an insufficient resistance to scratching and wearing.

SUMMARY

An aspect relates to a method for producing a polymer material to which a stable dyeing, coloring or printing can be applied or a combination of these techniques. The following in particular seeks to provide a method for producing a polymer material, which has been dyed, printed or a combination thereof, wherein the dyed polymer material and/or the printed image shows a good resistance to wearing, without requiring activation of the surface of the polymer material by corona treatment in advance of dyeing and without requiring application of an affinity improving coating to the surface of the polymer material in advance of printing or applying the dye or the use of a protective coating on top of the dyed polymer material.

The embodiments seek to provide a process for producing a dyed or pigmented polymer sheet, which shows a minimum risk to damaging of the pigmented part of the sheet, even in the absence of a protective coating. The embodiments also seek to provide a process for producing a printed polymer sheet, which when printed, shows a minimum risk to damaging of the print, even in the absence of a protective coating.

Thereto, embodiments of the present invention relates to a method for dyeing a polymer material with an aqueous pigment composition containing at least one pigment dispersed therein, wherein the polymer material is a blend comprising a first polymer composition and a second polymer composition which is compatible with the first polymer composition, which second polymer composition comprises a binding agent for the at least one pigment, wherein the method comprises the steps of:
  heating the polymer material to an activation temperature below the softening temperature of the polymer material,
  contacting the polymer material with the aqueous pigment composition for a period of time sufficient to form a pigmented polymer material,
  subjecting the pigmented polymer material to a fixation step to fixate the at least one pigment therein by cooling the pigmented polymer material to a fixation temperature which is lower than the temperature at which contacting of the polymer material with the aqueous pigment composition is carried out. In the description hereafter the wording dyeing, pigmenting and coloring shall all refer to the application of a pigment or dye, to the polymer material. The pigment or dye may be an inorganic or an organic material.

The inventor has surprisingly found that the method of embodiments of this invention provides a polymer material with an enhanced affinity for pigments contained in an aqueous dispersion of these pigments, and that the polymer material after having been contacted with the aqueous pigment composition according to the method of embodiments of this invention, shows a good color intensity, a good color stability and color fastness with a minimum risk to color removal upon subsequent contact with water or an aqueous composition, in particular as long as the temperature of the polymer material remains below the activation temperature.

Without wanting to be bound by this theory, the inventor believes that the presence of the binding agent and the use of an activation step co-operate to provide a polymer material with an improved permeability to pigments and probably also to an improved ability of the pigment to migrate into and within the polymeric material. The improved permeability may explain the ability of the polymer material of retaining a larger amount of pigment than prior art polymer materials and the observed substantially better color intensity and pigmentation quality with the same amount of pigment used. The method of embodiments of this invention shows the additional advantage that with transparent polymer materials, the transparence is not adversely affected.

It is further believed that the fixation step carried out after the polymer material has been contacted with the pigment composition, is capable of reducing the permeability of the polymer material surface, or even making it impermeable to the pigment that has penetrated the polymer material, at least when exposing the polymer material to a temperature below the fixation temperature. This may explain the observed improved color stability of the pigmented polymer material obtained with the method of embodiments of this invention.

The inventor further believes that at least part of the binding agent is capable of migrating from the second polymer composition towards and into at least part of the first polymer composition and/or into at least part of the remainder of the polymer material. This migration is assumed to occur when the polymer material is processed at elevated temperature for example to form a foam, fibers, films or sheets or is cast into an object, and will probably result in the presence of the binding agent not being limited to the surface of the polymer material or to the layer of the second polymer composition when the polymer material is for example produced by subjecting the first and second polymer composition to co-extrusion, but rather extending into at least part of the thickness of the polymer material. Thus, a migration of the binding agent into the polymer material over at least part of the thickness thereof can be achieved, i.e. a thickness which extends beyond the thickness resulting from the first polymer composition, which in turn may explain the enhanced ability of the pigment composition to penetrate into the thickness of the polymer material, and the observed improvement of the color intensity, quality and penetration depth.

It is further believed that the binding agent not only functions as a compatibilizer for the pigment, but that it may be capable of interacting with the pigment material by a physical or Vander Waals interaction or an ionic interaction or a combination thereof. Either only one of these interactions may dominate, or both types of interactions may co-operate to provide an improved immobilization or binding of the pigment within the polymer material. A binding action exerted to the pigments may also involve an encapsulation thereof in the polymer material, depending on the nature of the binding agent and the pigment or dye. The improved immobilization renders the method of embodiments of this invention suitable for use in polymer materials that may contact food in the course of their use.

The inventor has observed that the steps of activating the polymer sheet material and fixating the material again may be repeated several times, for example to apply several pigments in sequence, one after the other, by subjecting the polymer sheet to appropriate conditions as described above. As a result, the polymer material may for example first by subjected to dyeing or pigmentation to provide a polymer material in the desired color, and thereafter it may be printed. The inventor has observed that when applying different pigments in sequence, one after the other to the same position on the polymer material, a mixed color is formed similar to the color that would be formed when mixing the pigments. For example, applying a yellow and blue pigment in sequence, will give rise to a green pigmented polymer material. Thereby there is a minimum risk during printing, to washing out of the pigment applied in advance of the printing step, and in fact the printed image may be applied on top of the already present pigment in the polymer material. However, if so desired, a pigment may be removed from the polymer material by subjecting the polymer material to an activation process followed by for example washing with water, at high temperature which is not too far below the activation temperature.

Heating of the polymer material to the activation temperature may be carried out in advance of or simultaneously with contacting the polymer material with the aqueous pigment composition. Techniques for heating a polymer material are well known to the skilled person. Heating of the polymer material may be carried out using one of many techniques known to the skilled person, for example using contact heat, by contacting the polymer material with steam, heated air, heated liquid in particular heated water, heated by subjecting it to irradiation with a suitable energy, in particular UV, IR or visible light irradiation, or a combination of two or more of these techniques. Heating of the polymer material may also be carried out simultaneously with contacting the polymer material with the aqueous pigment composition, for example by submerging in the aqueous pigment composition, which has a desired elevated temperature sufficient to activate the polymer material.

In the method of embodiments of this invention it is preferred that the contact temperature at which the aqueous pigment composition contacts the polymer material, is higher than the fixation temperature. This reduces the risk to washing out of pigment upon subsequent water contact of the pigmented polymer material. For practical reasons and to favor the energetic balance, the contact temperature or the temperature of the pigment composition when contacting the polymer material will usually not be higher than but will rather be equal to or below the activation temperature, although the use of a contact temperature which is higher than the activation temperature is a possible embodiment of this invention. This enables maximizing pigment penetration into the polymer material and maximizing mobility of the pigment within the polymer material and achieving optimal color intensity within the shortest possible time.

The activation temperature may be selected by the skilled person taking into account the nature of the first polymer composition and the nature of the binding agent, the temperature at which softening of the polymer material which in fact is a blend may occur, and be selected such that the risk to degradation of these components or any unwanted deformation of the polymer material is reduced to a minimum, while at the same time achieving a desired degree of migration of the pigment. Usually, but in particular when a polyolefin, for example polypropylene is used as the first polymer composition, the activation temperature will be at least 60° C., at least 75° C., more at least 90° C., and will be below 150° C., below 140° C., depending on the nature of the pigment a temperature of below 130° C. may be used as well. In a preferred embodiment, as an activation temperature use is made of a temperature of between 50 and 150° C., between 75 and 140° C., and between 85 and 130° C. In another preferred embodiment, use is made of an activation and a contact temperature of at least 90° C., at least 100° C., and at least 110° C. The use of a higher contact temperature presents the advantage that the pigmentation intensity obtained, i.e. the amount of pigment integrated into the polymer material, hardly depends on the concentration of the pigment in the pigment composition and that small pigment concentrations give rise to an intense pigmenting of the polymer material.

The aqueous pigment composition, when being contacted with the polymer material, has an elevated temperature, on the one hand to improve color fastness and on the other hand to minimize the risk to de-activating or at least reducing the ability of the pigment to penetrate the polymer material and/or reducing the permeability of the polymer material to pigments. Therefore, the aqueous pigment composition has a temperature which is maximum 30° below the activation temperature, maximum 25° below the activation temperature, and a maximum 20° below the activation temperature when being brought in contact with the polymer material.

To apply the aqueous pigment composition to the polymer material, many methods known to the skilled person can be employed. For instance, the polymer material may be submerged or dipped in a bath using conventional disperse pigment techniques; the pigment composition may be applied by printing, spraying, using a cascading roll technique, or jet dyeing which permits using high-temperatures and impingement of the pigment onto the fabric or film moving through a venturi jet system. It shall be clear that many other suitable techniques exist for applying the pigment composition.

Contacting of the polymer material with the pigment composition may be carried out at atmospheric pressure in an open or closed reactor, or it may be carried out in a closed reactor at elevated pressure, for example at least 1.2 atm, at least 1.5 atm., at least 2 atm or even about 3 atm.

The time during which heating of the polymer material is carried out to achieve activation, will usually be selected by the skilled person in function of the envisaged pigmentation intensity, the nature of the pigments, the nature of the polymer material, the ability of the pigments to penetrate the polymer material, and the temperature at which heating is carried out and may vary from a few minutes to a few hours, for example. Varying the process parameters a.o. the amount of pigment used, the contact time, the temperature and degree of activation of the polymer material, the amount of binding agent contained in the polymer material will permit to vary the color intensity i.e. the amount of pigment capable of penetrating the polymer material, the degree or thickness to which the pigment may penetrate the polymer material, i.e. whether the pigment penetrates over a part of the material thickness of the polymer material or over the entire polymer material thickness as well as the color fastness, i.e. the degree to which the pigment remains bound or encapsulated in the polymer material without being washed out upon water contact.

To optimize the affinity of the pigment composition for the polymer material, use is made of an aqueous pigment composition with a pH of between 2.0 and 12, more between 3.0 and 6.0, and between 4.0 and 5.5.

Drying of the polymer material after it has been contacted with the pigment composition, may give rise to fixation of the color.

In a preferred embodiment, the polymer material is subjected to drying after having been contacted with the aqueous pigment composition and in advance of being subjected to the fixation step. To dry the dyed polymer material, many techniques generally known to the skilled person may be used, such as wiping with dry cloth, an air stream, a stream of heated air or any other gas, may be used. When use is made of heated air, the temperature of the air will not be higher than the activation or the contact temperature.

In a further preferred embodiment, in advance of drying or fixation the polymer material is subjected to washing with a solution selected from the group of water, an aqueous solution having a pH of between 2 and 12, with the purpose of removing any excess amount of pigment that remained on the surface of the polymer material and has not been bound, from the polymer material.

To ensure optimal migration ability of the binding agent and optimal compatibility of the first and second polymer material, in a preferred embodiment the second composition comprising the binding agent comprises one or more of the polymers contained in the first polymer composition, the same olefin or olefins contained in the first polymer composition, in particular polypropylene.

According to embodiments of the present invention, the concentration of the binding agent in the second composition may vary between wide ranges, but it will be chosen in such a way that the compatibility with the first polymer composition is not adversely affected. Therefore, the concentration of the binding agent in the second composition will usually be between 0.05 and 20 wt. %, between 0.05 and 15 wt. %, between 1.0 and 15 wt. %, and between 1.0 and 12.5 wt. % with respect to the total weight of the polymer material.

A preferred binding agent for use with embodiments of the present invention is a blend consisting essentially of:
(i) a terpolymer selected from: a first terpolymer of ethylene, acrylic or methacrylic ester and maleic anhydride having a maleic anhydride content of at least 2% by weight, or
(ii) a second terpolymer of ethylene, acrylic or methacrylic ester and glycidyl methacrylate having a glycidyl methacrylate content of at least 7% by weight, and mixtures thereof, and an amine-terminated polyamide. Each of the first and second terpolymer are selected such that they have a Melt Flow Index of maximum 30 g/10 min at 190° C. and 2.16 kg. More, the weight ratio of terpolymer to amine-terminated polyamide in the additive blend is from 3:1 to 1:1.

Polymer Composition

The method of embodiments of this invention is suitable for use with a variety of polymers. The first polymer composition may either be a synthetic polymer material, for example a polyolefinic material, a polyester, for example a semi aromatic polyester for example polyethylene terephtalate (PET), a polybutylene terephtalate (PET), an aliphatic polyester for example polycaprolactone, polylactic acid, a polyamide, for example an aliphatic polyamide, for example nylon 6 and nylon 66, a polyphtalamide or an aramide, or a mixture of two or more of these materials. Irrespective of their affinity for aqueous pigment dispersions, the method of embodiments of this invention has been found suitable to provide a polymer material with a high affinity for pigments, and to achieve immobilization of the pigment or pigments in the polymer material. The second polymer composition may comprise the same synthetic polymer material as the first polymer composition, or a different one, but it will contain the same synthetic polymer to provide maximum compatibility.

It shall be clear that the activation temperature, the contact temperature and the fixation temperature may be selected by the skilled person taking into account the nature of the synthetic polymer used in the first and second polymer composition, in view of minimizing the risk to unwanted decomposition of deformation.

The method of embodiments of this invention is suitable for use with a variety of polyolefinic materials for the polyolefin composition. Within the scope of embodiments of this invention polyolefins comprise polymers produced a certain percentage, ≥50% by weight of one or more olefinic monomers. Examples of homo- and copolymers suitable for use with embodiments of the present invention include polyethylene homopolymers, ethylene-α-olefin copolymers, polypropylene-α-olefin copolymers, polypropylene homopolymers, polybutylene homopolymers, polybutylene-α-olefin copolymers, butylene-propylene copolymers, butylene-ethylene copolymers, propylene-ethylene copolymers, butylene-propylene-ethylene terpolymers, ethylene-vinyl acetate copolymers, ethylene-methacrylic acid copolymers, ethylene-styrene polymers and blends of two or more of these polymers. An example of an ethylene homopolymer suitable for use with embodiments of this invention is (e.g. linear low-density polyethylene—LLDPE. A particularly preferred material for use with the method of embodiments of this invention however is polypropylene, in particular isotactic polypropylene, because of the shape memory shown by the material. Other preferred polymer materials comprise a major proportion of polypropylene and/or an olefin block and/or random copolymer containing up to about 15% of the copolymer of at least one copolymerisable olefin (such as ethylene) and/or polyester. These materials may be preferred when the use of polymer films is envisaged, Synthetic polymer materials used in the method of embodiments of the present invention are generally commercially available in the form of pellets or granules which may be melt blended or mechanically mixed.

In a preferred embodiment relating to polymer films, the first polymer composition may comprise a major proportion of polypropylene such as isotactic polypropylene homopolymer, but also may comprise coextruded multilayer films where the polymer of at least one layer is isotactic polypropylene homopolymer, and the polymer of one or both outer layers is a surface layer polymer having different properties to the isotactic polypropylene homopolymer. In a further preferred embodiment relating to polymer films, the second polymer composition may also comprise a major proportion of polypropylene such as isotactic polypropylene homopolymer, but also may comprise coextruded multilayer films where the polymer of at least one layer is isotactic polypropylene homopolymer, and the polymer of one or both outer layers is a surface layer polymer having different properties to the isotactic polypropylene homopolymer. If so desired the polymer films may be crosslinked using a technique considered suitable by the skilled person such as electron beam (EB) or UV crosslinking, if necessary by use of suitable additives in the film.

The method of embodiments of this invention is suitable for use with a wide variety of shaped polymer materials, for example the polymer material can be used in the form of fibers, i.e. the fibrous material as such or the fibers may have been processed to a knitting, a braiding, a needling, into fiber strands, a non-woven or woven sheet or any other shape produced from fibers known to the skilled person. The fibers may be used as staple fibers, continuous filament yarns, texturized filament yarns, tows, films, nonwovens, woven and knitted fabrics, needled felt and the like. The fibers may be obtained by extrusion of the polymer material comprising the first polymer composition, for example a polyolefin composition and the second composition comprising the binding agent. Thereby the first and second composition may be blended before producing the fibers, or the fibers may comprise a first layer of the first polymer composition and a second layer of the second polymer composition containing the binding agent.

The polymer material of embodiments of this invention can also be used in the form of a polymer foam, in the form of a solid shape of the polymer material obtained by casting, molding, injection molding, blow molding, in mold labelling, extruding or otherwise shaping of the polymer material.

The polymer material of embodiments of this invention can further be used in the form of a polymer film, obtained for example by blow molding or extrusion or any other suitable technique. The polymer film material may be monolayer film or sheet produced from the polymer material, or it may comprise a first sheet made of a first polymer composition comprising the polyolefin composition, and a second sheet comprising a second composition comprising the polyolefin composition and the binding agent. The first sheet may be a monolayer sheet, or a multilayer sheet. The second sheet may also be a monolayer or a multilayer sheet. If so desired the polymer film material may further comprise additional layers thus, embodiments of the present invention may relate to a multilayer sheet comprising one or more layers of the first polymer composition and one or more layers of the second polymer composition comprising the binding agent. Additional layers of thermoplastic polymers may be added, for example layers comprising polyethylene, polyurethane etc. But the additional layers consist essentially of polypropylene, optionally containing the binding agent. If so desired, the polymer sheet material may contain further layers, to optimize it for the envisaged use. For example, a coating of a metal film may be applied on top of the polymer sheet material, either before or after printing. A layer comprising the second polymer composition will usually form at least one of the outer layers of the multi-layer sheet, in particular when it is the intention to subject the sheet to printing on the side containing the layer with the second polymer material. It is remarked that the multi-layer sheet may be dyed according to the method of embodiments of this invention, in advance of being printed.

The total thickness of the polymer film is not critical to embodiments of the invention and will generally be adapted considering the envisaged application of the film. Suitable total film thicknesses range from 25 to 250 microns, often from 25 to 150 microns being preferred, but other film thicknesses may be used as well.

Where the polymer sheet of embodiments of this invention is intended to be applied to an object, it may be desirable to apply an adhesive to a side of the sheet. To that end, the adhesives generally known to the skilled person may be used. Typical examples are acrylate, polyethylene or polypropylene based adhesives.

Within the scope of embodiments of this invention, a wide variety of synthetic polymers may be used for incorporation into the first polymer composition. In a particularly preferred embodiment, the first polymer composition comprises a polyolefin, in particular polypropylene. The second polymer composition is selected such that it is compatible with the first polymer composition and comprises a binding agent for the at least one pigment. The second polymer composition will usually further comprise a synthetic polymer into which the binding agent is dispersed. The second synthetic polymer is chosen in such a way that optimal compatibility with and adhesion to the first synthetic polymer may be achieved. Thereto, the second polymer material contains the same synthetic polymer as the first polymer material.

One or more layers of the sheet material of embodiments of the present invention may be opaque or transparent depending on the intended use of the film.

Within the scope of embodiments of this invention, the first polymer material, the polyolefinic material will be chosen in such a way that it shows a good compatibility with the material for the binding agent to ensure good adhesion. In case of insufficient compatibility, a compatibilizer may be included in the material for the polymer layer.

Binding Agent

Examples of binding agents suitable for use with embodiments of the present invention include copolymers having a polyolefin backbone, a backbone of ethylene/maleic anhydride or ethylene/alkyl (meth)acrylate/maleic anhydride.

According to a further preferred embodiment the binding agent is a polymer blend comprising
- at least 15.0 wt. %, at least 20.0 wt. %, more at least 25.0 wt. % and maximum 50.0 wt. % with respect to the weight of the binding agent of a polymer containing amine terminated polyamide moieties, an amine terminated polyamide. In a preferred embodiment, use is made of a polymer comprising a polyolefin backbone with at least one graft of amine terminated polyamide. In another preferred embodiment use is made of an amine terminated polyamide.
- at least 50.0 wt. % and maximum 85.0 wt. %, maximum 80.0 wt. %, more maximum 75.0 wt. % of a flexible polyolefin, an ethylene-maleic anhydride or an ethylene-acrylic acid or methacrylic acid ester-maleic anhydride copolymer. The maleic anhydride content is at least 2.0 wt. %

In a preferred embodiment the binding agent may further comprise a copolymer of a flexible polyolefin, ethylene, with an ester of acrylic or methacrylic acid and glycidyl methacrylate. Use is made of a copolymer having a glycidyl methacrylate content of at least 7.0 wt. %. The copolymer may have on average at least one polyamide graft attached to the backbone by an unsaturated carboxylic acid anhydride.

A suitable binding agent is a copolymer having a polyolefin backbone, in a backbone of ethylene/maleic anhydride or ethylene/alkyl (meth)acrylate/maleic anhydride and on average at least one polyamide graft attached to the backbone by an unsaturated carboxylic acid anhydride, in particular an anhydride capable of reacting with an amine-terminated polyamide. The grafts are homopolymers consisting of caprolactam residues, 11-aminoundecanoic acid residues or dodecalactam residues or of copolyamides, comprising the afore-mentioned residues describe above. Other suitable polyamides for grafting comprise polyamide-6 (polycaprolactam); 6,6 (polyhexamethylene adipamide); 11,12; 4,6; 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl) propane or 2,2-bis-(p-aminocyclohexyl) propane and from terephthalic acid and 4,4'-diaminodicyclohexylmethane.

Such copolymers are disclosed in US20030199635. Such copolymers are commercialized by Arkema, under the name Lotader™.

Particularly suitable binding agents for use with embodiments of the present invention are blends consists essentially of a terpolymer which is selected from:
1. a first terpolymer selected from: a first terpolymer of ethylene, acrylic or methacrylic ester and maleic anhydride having a maleic anhydride content of at least 2% by weight. In a preferred embodiment the first terpolymer has a Melt Flow Index of maximum 30 g/10 min at 190° C. and
2. a second terpolymer of ethylene, acrylic or methacrylic ester and glycidyl methacrylate having a glycidyl methacrylate content of at least 7% by weight, and mixtures thereof. In a preferred embodiment the second terpolymer has a Melt Flow Index of maximum 30 g/10 min at 190° C. 3. and mixtures of the first and second terpolymer.

These may be used in combination with an amine-terminated polyamide. In a preferred embodiment the amine terminated polyamide has a Melt Flow Index of maximum 30 g/10 min at 190° C. In a further preferred embodiment, the weight ratio of terpolymer to amine-terminated polyamide in the additive blend is from 3:1 to 1:1, is from 2:1 to 1:1.

Suitable polyamides may be prepared by the polymerisation of a monoamino-monocarboxylic acid, or its equivalent lactam, having at least 2 carbon atoms between the amino and carboxylic acid group, by polymerization of substantially equimolar proportions of a diamine which contains at least 2 carbon atoms between the amino groups and a dicarboxylic acid or a monoaminocarboxylic acid, or a lactam as set out above, together with substantially equimolar proportions of a diamine and a dicarboxylic acid. The dicarboxylic acid may be in the form of a functional derivative, such as an ester or acid chloride. Examples of monoamino-monocarboxylic acids or lactams thereof which are useful in preparing the polyamides include compounds having from 2 to 16 carbon atoms between the amino and carboxylic acid groups, said carbon atoms forming a ring containing the —CO—NH— group in the case of a lactam. Diamines suitable for use in the preparation of the polyamides include the straight-chain and branched-chain alkyl, aryl and alkylaryl diamines. The dicarboxylic acids may be represented by the formula: HOOC—R—COOH where R is a divalent aliphatic or aromatic group containing at least 2 carbon atoms. Examples of suitable aliphatic acids are sebacic acid, octadecanedioic acid, suberic acid, glutaric acid, pimelic acid and adipic acid.

Examples of polyamides, or nylons as they are also known, include, for example: polyamide-6 (polycaprolactam); 6,6 (polyhexamethylene adipamide); 11,12; 4,6; 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl) propane or 2,2-bis-(p-aminocyclohexyl) propane and from terephthalic acid and 4,4'-diaminodicyclohexylmethane. Mixtures and/or copolymers of two or more polyamides may also be used. Polyamides may be obtained by the ring opening polymerization or polycondensation of the polyamide forming components in the presence of a molecular weight modifier. As molecular weight modifier dicarboxylic acids with from 4 to 20 carbons may be used.

Co-polyamides are polycondensation products of the polyamides. Suitable co-polyamides may be obtained by polycondensation of a suitable monomer blend, such as a monomer mixture having more than 10% by weight, such as 20% to 40% by weight, units with a linear aliphatic chain with from 8 to 12 carbon atoms. Such co-polyamides are commercially available, for instance the Platamids™ as supplied by Arkema for use in hot melt adhesives. Co-polyamides, suitable as component for use in embodiments of the invention may, for instance, be of the nylon type: polycondensation products of monomer mixtures PA6/PA6,6/PA12. These are available with a composition (by weight) for example of roughly 40:20:40 or 40:40:20.

The co-polyamides may comprise the polycondensation products of at least two compounds selected from the group consisting of lactams of 6 to 12 carbon atoms and aminocarboxylic acids of 6 to 12 carbon atoms, and equimolar quantities of a diamine of 4 to 12 carbon atoms and a diprimary carboxylic acid of 6 to 36 carbon atoms. For instance, suitable co-polyamides may comprise the polycondensation products of say 20 to 90% by weight, based on the co-polyamide, of at least one lactam or aminocarboxylic acid of 6 to 12 carbon atoms and say 80 to 10% by weight, of equimolar quantities of a diamine of 4 to 12 carbon atoms and a diprimary carboxylic acid of 6 to 36 carbon atoms.

The quantity of lactam or aminocarboxylic acid in the co-polyamide may suitably be from 20 to 60% by weight of the co-polyamide. The diamine in the co-polyamide component may be primary di-amine or a secondary di-amine, for example piperazine.

The co-polyamide may be a co-polyamide having 20% to 60% by weight of the lactam or carboxylic acid component wherein the lactam or carboxylic acid components comprises a mixture of at least 2 cyclolactams or linear aliphatic aminocarboxylic acids. The lactam or carboxylic acid component may contain from 15% to 60% by weight of 11-aminoundecanoic acid and/or 12-aminododecanoic acid.

The molecular weight distribution of the co-polyamides, in which the individual polyamide segments may be present in ordered form or in a random order, is not particularly important.

Suitable polyetherpolyamides, for use as polyamide of embodiments of the invention, are the products formed from polycondensation of polyetherdiamines, dicarboxylic acids, dimeric acids and from lactams, such as caprolactam. The polyetherpolyamides may be block copolymers. An exemplary polyetherpolyamide may be formed from the polycondensation of caprolactam, a dimeric acid and a polyetherdiamine such as a Jeffamine™. Polyetherpolyamides suitable for use as polyamides in embodiments of the invention are, for example, as set out in U.S. Pat. Nos. 5,140,065 and 4,356,300.

The number average molecular weight for the polyamide is suitably from 1000 to 5000 g/mol, with the polyamide (i.e. polyamide or co-polyamide or polyetherpolyamide) having a melting point of 125° or less.

The polyamide for use in the binding agent is specifically a co-polyamide.

In all aspects of embodiments of the present invention the weight ratio of terpolymer to amine-terminated polyamide in the additive blend is from 3:1 to 1:1, suitably from 2.5:1 to 1:1, more suitably from 2:1 to 1:1, for instance from 1.9:1 to 1.2:1, such as from 1.8:1 to 1.4:1.

The terpolymer is the first terpolymer of ethylene, acrylic or methacrylic ester and maleic anhydride having a maleic anhydride content of at least 2% by weight. More, the terpolymer is the first terpolymer of ethylene, acrylic or methacrylic ester and maleic anhydride having a maleic anhydride content of at least 2% by weight and the amine-terminated polyamide is a co-polyamide.

The above-described binding agent may be added as such to the first polymer composition, for example in the form of a powder or in the form of granules. In that case the second polymer composition will exclusively consist of the binding agent. The binding agent will however usually be applied as a blend with another polymer, the polymer material contained in the first polymer composition or a polymer which shows a good compatibility with the first polymer composition. Often the binding agent will be used as a masterbatch of a synthetic polymer material and the binding agent, blended in advance of processing it into the form in which it is to be used, for example in advance of processing the second polymer composition into a foil, into fibers, or in advance of molding it into a shape.

Pigment Compostion

The method of embodiments of this invention includes the step of contacting the polyolefin material with an aqueous dispersion or suspension of at least one pigment. The dispersion may comprise one single pigment, or a mixture of two or more pigments. An aqueous dispersion will usually comprise at least 60 wt. % of water, but the water content may be higher or lower and conversely the pigment content may be higher or lower than 40.0 wt. %. Although aqueous dispersions are preferred, a minor amount of organic solvent may be present in the dispersion as well, as well as the conventional additives used to obtain a stable pigment dispersion.

A wide variety of pigments is commercially available. Various disperse pigments are disclosed in "Dyes and Pigments by Colour Index and Generic Names" set forth in Textile Chemist and Colourist, July 1992, Vol. 24, No. 7, a publication of the American Association of Textile Chemists and Colourists. Generally, dyes and pigments have been classified into groups according to two different classification methods, either according to the chromophore of the molecule, or according to the application class of end-use. The disperse pigments used in embodiments of the present invention are generally non-water-soluble. Preferred pigments include anthraquinone blue or red, diazo red or nitro yellow. The pigment composition may also take the form of a paste, for use in roller printing or screen printing.

The pH of the pigment composition is not critical to embodiments of the invention and may be adjusted if desired using a suitable buffer. In a preferred embodiment, the aqueous pigment composition has a pH of between 2.0 and 12.0, between 3.0 and 6.0, more between 4.0 and 5.5.

When contacting the polymer material with the pigment composition, the mixture may be agitated to promote pigment resorption by the polymer material.

Additives

The polymer material will generally comprise one or more additives conventionally employed in the intended application, for example in the manufacture of films without being limited thereto. Examples of such additives include dyes, pigments, colorants, lubricants, anti-oxidants, anti-static agents, surface-active agents, stiffening aids or plasticizers, gloss-improvers, UV attenuating materials (e.g. UV light stabilizers); sealability additives, tackifiers, anti-blocking agents, mold release agents, an adhesive layer (e.g. a pressure sensitive adhesive); an adhesive release layer (e.g. where use is made of a peelable backing material).

The polymer material may comprise inert particulate additives, for example particulate materials having an average particle size of from about 0.2 μm to about 4.5 μm, more from about 0.7 μm to about 3.0 μm, to improve film gloss. The particulate material will generally be present in a concentration of at least 0.05%. between 0.1% and 0.5% by weight. Suitable inert particulate additives may be inorganic or organic or a mixture of two or more such additives. Particularly suitable particulate inorganic additives include talc, metal or metalloid oxides, such as alumina and silica, solid or hollow, glass or ceramic micro-beads or microspheres. Suitable organic additive comprises spherical particles of an acrylic and/or methacrylic resin comprising a polymer or copolymer of acrylic acid and/or methacrylic acid and/or an ester thereof.

Some or all the desired additives listed above may be added to the bulk polymer material, or they may be mixed to provide a coating for the film and/or may form the outer or surface layer. Alternatively, some or all the preceding additives may he added separately.

The embodiments also relate to a method for producing a printable polymer sheet material, the method comprising the steps of producing a polymer sheet material from a first polymer composition, a first polymer composition comprising at least one polyolefin, in particular polypropylene, and a second composition comprising a binding agent for at least one pigment to be applied to the sheet material, followed by heating the polymer sheet material to an activation temperature below the softening temperature of the polymer material, contacting the polymer sheet material with the aqueous pigment composition at a contact temperature for a period of time sufficient to form a pigmented polymer material, subjecting the pigmented polymer sheet material to a fixation step to fixate the at least one pigment therein by cooling the pigmented polymer material to a fixation temperature which is lower than the temperature at which contacting of the polymer material with the aqueous pigment composition is carried out.

The embodiments further relate to a method for producing a printed polymer sheet material, the method comprising the steps of producing a polymer sheet material from a first polymer composition, a first polymer composition comprising at least one polyolefin, in particular polypropylene, and a second composition comprising a binding agent for at least one pigment to be applied to the sheet material, followed by heating the polymer sheet material to an activation temperature below the softening temperature of the polymer material, contacting the polymer sheet material with an aqueous ink composition and applying a printed image at a contact temperature, subjecting the printed polymer sheet material to a fixation step to fixate the at least one pigment therein by cooling the pigmented polymer material to a fixation temperature which is lower than the temperature at which contacting of the polymer material with the aqueous pigment composition is carried out.

The printed image is applied to the side of the film comprising the second polymer composition. However, the inventors have observed that the printed image may also be applied to the opposite side of the film, i.e. the side comprising the first polymer composition, to obtain a stable, scratch resistant print as described above. Without wanting to be bound by this theory, it is believed that the binding agent can migrate from the second polymer composition into the remainder of the polymer material, and thereby improve the affinity for pigments of the polymer material as a whole.

In this method for producing a printed polymer sheet material, use can be made of a polymer sheet material which has been dyed according to the method of embodiments of this invention, or not. The polymer sheet material can be a woven material produced from fibers obtained with the process of embodiments of this invention, for example for the production of inlays for suitcases or any other type of handbags—including materials that had been dyed in advance of being printed—, lining or vesture of car interior parts such as the seats, lining or vesture for seating furniture, bedding, application of a printed image to carpet, or to carpet material that had been dyed in advance, etc. The polymer sheet material may however also be a film produced from the polymer material or a co-extruded sheet comprising several layers of plastic material, wherein at least one of the layers comprises the second polymer composition and the binding agent as described above.

The embodiments also relates to the use of the printed polymer sheet material obtained by the method as described above in applications for example as a decorative sheet for 3D objects, for example furniture, in particular cupboards, table leaf's, car interior parts for example the dashboard or any other rigid parts, the outer or inner face of suitcases, the outer wall of electronic equipment, and many other objects and/or applications. Such printed polymer sheets may be adhered to the surface of the objected to be decorated by means of an adhesive. Thereby, the polymer sheet material may be adhered to the surface of the objected to be decorated either with its printed side or the opposite, non-printed side, in case use is made of a single side printed polymer sheet material.

Applications for woven materials produced from fibers obtained with the process of embodiments of this invention include the production of inlays for suitcases or any other type of handbags, lining or vesture of car interior parts such as the seats, lining or vesture for seating furniture, bedding etc.

The polymer sheet material may be printed using any technique considered suitable by the skilled person, those in which water-based inks are used although the use of solvent based inks may be considered as well. The process of embodiments of the present invention may be used to produce larger series of a printed image, and therefore digital printing techniques may be preferred. To that end laser or inkjet printing may be used. The process of embodiments of the present invention may however also be used to produce one single printed sheet, customized to the wishes of the customer, and in that case digital printing techniques may be preferred.

When printing the polymer sheet material obtained by the process of embodiments of this invention using solvent or water-based inks, migration and encapsulation of the ink, pigment and/or dye into the bulk of the polymer sheet material contribute to an important extent to the formation of the ultimate printed image. This process complements the penetration of the pigment by entrainment with the solvent, which is the predominant process in the known printing processes and has the effect that the print quality may be significantly improved.

Within the scope of embodiments of the present invention water-based inks include ink compositions which comprise one or more inorganic pigments or organic dyes. Water-based inks may also include aqueous or solvent-based solutions or dispersions which contain one or more flavoring agents or fragrances.

It shall be clear that in a preferred embodiment the steps of activating the polymer sheet material, contacting it with a pigment composition and fixating the material again may be repeated several times by subjecting the polymer sheet to appropriate conditions as described above.

Without wanting to be bound by this theory, it is believed that the fixation step may cause the surface of the polymer sheet to become impermeable to the ink, so that the at least one pigment or dye become encapsulated by the material of the polymer sheet, but other phenomena may play a role as well. It is believed that the presence of the binding agent assists in improving migration of the at least one pigment and/or dye.

The printed polymer sheet material obtained with the process of embodiments of the present invention are suitable for use in a wide variety of techniques for further shaping of the sheet, in particular in a so-called film insert molding process, where the printed polymer sheet material is positioned in a mold cavity, clamped and shaped. The process may further comprise the step of injecting a resin in the mold, which is molded together with the printed polymer sheet material of this invention to provide a molded part. The printed polymer sheet material of embodiments of this invention may also be subjected to pressure or vacuum forming, as such or against the surface of an object to be decorated. The printed polymer sheet material of embodiments of this invention is further suitable to be shaped and applied to the surface of an object in a mold labelling process. The further shaping of the printed polymer sheet material as described herein, is carried out after the sheet has been printed to facilitate the printing and fixation process, but it may be carried out before the printing step as well.

The process of embodiments of the present invention is particularly suitable for producing films or sheets for use in the packaging of food materials. As the at least one pigment and/or dye is immobilized and/or encapsulated in the polymer sheet material and is only released if the polymer sheet material is heated to a sufficiently high temperature, i.e. a temperature above the fixation temperature, the risk to migration from the polymer sheet material may be reduced to a minimum. Therefore, the risk that the food would be contacted with the at least one pigment or dye in normal use of such food packaging may be reduced to a minimum.

It shall be clear to the skilled person that the steps of producing the polymer sheet material, activating, printing the polymer sheet material and fixating the printed image can be carried out in separate devices, but that it is also possible to combine all process steps into one single device. It shall be further clear to the skilled person that the process steps described above can be carried out batch wise and in a continuous process.

The embodiments are further elucidated in the examples below.

EXAMPLE 1-3

A 3-layer film was produced using co-extrusion of polypropylene supplied by Borrealis, at a temperature of between 240 and 260° C. The first and second layer consisted essentially of polypropylene. The third layer contained varying amounts of binding agent. As the binding agent use is made of a mixture of
(1) a first terpolymer of acrylic acid and maleic anhydride having a maleic anhydride content of 4% by weight,
(2) a second terpolymer of ethylene, acrylic or methacrylic ester and glycidyl methacrylate having a glycidyl methacrylate content of 10% by weight
(3) an amine-terminated polyamide,
in a weight ratio of terpolymer to amine-terminated polyamide of 1.5:1.

The amounts of binding agent were respectively 5 wt. % with respect to the weight of the third layer, 10 wt. % and 20 wt. %. The first layer had a thickness of 80 micron, the second layer had a thickness of 10 micron, the third layer had a thickness of 10 micron.

The film was aged by maintaining it at room temperature 25° C. for 1 week.

EXAMPLE 4

Both sides of the film were printed in ink-jet printing using a water-based ink having a pH of 4.5. Before being subjected to printing, the film was heated to a temperature of respectively 70, 80 and 90° C. using contact heat. After the printing had been finished, the printed image was fixated by cooling the printed film to a temperature of 75° C. The ink had a temperature of 90° C. during the printing process.

The quality of the print was evaluated using a standard ink pull-off tape test immediately after printing of the polymer sheet material had been finished. In such testing no or hardly any ink, pigment or dye could be removed. In a standard ink pull-off tape test, the printed side of the polymer sheet material is covered with adhesive tape, the tape is rubbed and removed, and the presence of ink, pigment or dye on the tape is measured. No or hardly any removal of ink, pigment or dye could be observed from the side of the film which contained the layer comprising the binding agent.

The quality of the print was further evaluated according to ISO 5470-2:2003 by moving a plate to which four plastic wheels are attached, over the printed side of the film. No or hardly any removal of ink, pigment or dye could be observed. No or hardly any removal of ink, pigment or dye could be observed from the side of the film which contained the layer comprising the binding agent.

The opposite side of the film, i.e. the side which did not contain the binding agent, showed a slight release of pigment.

In the ISO 105 X12 test, a color fastness grade of 5 could be observed.

EXAMPLE 5

Example 4 was repeated, with the exception that the ink was used at room temperature, i.e. had a temperature of 25° C. When contacting the film with water, the film maintained hardly any pigmentation, i.e. the majority of the ink that had been applied to the film was removed.

Also, when subjected to a standard ink pull-off tape test, where the printed side of the polymer sheet material is covered with adhesive tape, the tape is rubbed and removed, and the presence of ink, pigment or dye on the tape is measured. The majority of the pigment was removed from both sides of the film, also from the side of the film, which contained the layer comprising the binding agent.

The quality of the print was further evaluated by moving a plate to which four plastic wheels are attached, over the printed side of the film as described above, according to ISO 5470-2:2003. The majority of the pigment present on the side of the film, which contained the layer comprising the binding agent could be removed. Also, the opposite side of the film, i.e. the side which did not contain the binding agent, showed a significant release of pigment.

In the ISO 105 X12 test, a color fastness grade of 1 could be observed.

From this experiment it can be concluded that cooling of the polymer material results in a fixation of the structure and counteracts penetration of pigment from the outside into the polymer material or release of pigment from the polymer material.

EXAMPLE 6

24 plates were produced having a standardized dimension of a length of 64 mm, a width of 50 mm and a thickness of 2 mm, using polypropylene supplied by Borrealis, by melting of the polypropylene at a temperature of between 240 and 260° C. followed by injection molding of the standardize plates.

The polypropylene contained 10 wt. % of the binding agent of example 5, with respect to the weight of the polymer composition.

Each of the thus produced plates was contacted with a pigment dispersion of a blue and a red pigment, in particular Bemacron pigments, by submerging the plates in the pigment composition for a contact time of respectively 15, 30, 60 and 120 minutes, the pigment composition had a temperature of respectively 70, 80 and 90° C. at atmospheric pressure and at a pressure of 1.5 atm.

The pigment composition had a pH of 3.9.

Varying pigment concentrations were used, in particular 0.0001 wt. %, 0.001 wt. %, 0.01% wt. % and 0.1 wt. % of pigment with respect to the weight of the composition. Thereafter, the plates were removed from the pigment dispersion. The plates that had been contacted with a 70° C. pigment dispersion were cooled to a temperature of 50° C., rinsed with water to remove the excess of pigment dispersion that accumulated on the surface. The plates that had been contacted with an 80° C. and 90° C. pigment dispersion were cooled to a temperature of 70° C., rinsed with water to remove the excess of pigment dispersion that accumulated on the surface.

The following observations were made:
when comparing the experiments carried out at the same temperature, same pressure, and same pigment concentration, with a varying contact time, the longer the contact time, the more intense the coloration of the polypropylene plates. The biggest difference in coloration was observed between a contact time of 15 minutes and 60 minutes. At a contact time of 60 minutes, intensively colored plates were obtained. Increasing the contact time to 120 minutes resulted in further increase in the coloration of the plates, but the difference was less pronounced than with 15-60 minutes.
when comparing the experiments carried out at the same pressure, same contact time and same pigment concentration, with a varying contact temperature, using a higher temperature increased the intensity of the coloration of the polypropylene plates
when comparing the experiments carried out at the same temperature, same contact time and same pigment concentration, the use of a higher pressure increased the intensity of the coloration of the polypropylene plates
when comparing the experiments carried out at the same temperature, the same pressure, same contact time, but increasing the pigment concentration, increased the coloration of the polypropylene plates. With a concentration of 0.0001 wt. %, at atmospheric pressure only a faint coloration of the plate could be obtained.
When cutting through the plates, it was observed that the pigment had penetrated the plates over a thickness of about 0.5 mm from all sides of the plates. In particular it has been observed that the plates were penetrated over about 30% of their over-all thickness.

When subjecting the pigmented plates to the ISO 105 X12 test, a color fastness grade of 5 could be observed.

EXAMPLE 7

The same plates were used as in example 6, which contained 10 wt. % with respect to the total weight of the polymer material of the binding agent. The procedure was repeated as described in example 6, using a temperature of 90° C., and 120 minutes of contact time. As a pigment use was made of a green fluorescent pigment, of microbial origin.

It has been observed that a stable binding of the green fluorescent pigment in the polypropylene plates of embodiments of this invention could be obtained. This is surprising as incorporation of fluorescent materials into polymer materials did not yet lead to satisfactory results.

When subjecting the pigmented plates to the ISO 105 X12 test, a color fastness grade of 5 could be observed.

EXAMPLE 8

The plates produced in example 4 were subjected to an after treatment to test the quality of the pigmentation.

To that end each of the plates was submerged for 15 minutes in a solution at 60° C. of
2 g/l of Redulit Gin, a reduction agent
2 g/l of Sarabid DLO, an anionic surfactant
A mixture of 2 g/l of Sarabid DLO, 4 mg/l of NaOH and 3 g/l of hydrosulfite
A mixture of 2 g/l of Sarabid DLO, 4 mg/l of NaOH and 2 g/l of Redulit F.

None of these treatments caused release of pigment contained in any of the plates. It can therefore be concluded that the pigmented polymer material obtained with embodiments of the present invention is suitable for use with food, as no pigment release occurs when the pigmented side of the polymer material is contacted with chemical compounds frequently used with food.

EXAMPLE 9

7 plates were produced having a standardized dimension of a length of 64 mm, a width of 50 mm and a thickness of 2 mm, using polypropylene supplied by Borrealis, by melting of the polypropylene at a temperature of between 240 and 260° C. followed by injection molding of the standardize plates.

The polypropylene contained varying amounts of binding agent, in particular 1.0 wt. %, 2.5 wt. %, 5 wt. %, 7.5 wt. %, 10 wt. %, 12.5 wt. %, 15 wt. %, with respect to the weight of the polymer composition.

Each of the thus produced plates was contacted with a pigment dispersion of Bemacron E, by submerging the plates in the pigment composition of 120° C. for a contact time of 60 minutes. The pigment composition had a pH of 3.9. Thereafter, the plates were removed from the pigment dispersion and cooled to a temperature of 70° C., rinsed with water to remove the excess of pigment dispersion that accumulated on the surface.

All plates had a similar color and intensity of coloration. It is assumed that at a temperature of 120° C., either optimal permeability of the polymer material for the pigment dispersion may be achieved, or that the affinity of the polymer material for the pigment dispersion is optimal at that temperature, or that the pigment shows enhanced mobility at that temperature, or a combination of two or more of these factors.

When subjecting the pigmented plates to the ISO 105 X12 test, a color fastness grade of 5 could be observed.

EXAMPLE 10

A sheet was produced of a woven material, made by weaving of polypropylene fibers which contained respectively 5.0 and 8.0 wt. % of the binding agent used in example 1. The fibers were woven to form a cloth.

The woven fiber cloth was dyed with a grey pigment and thereafter subjected to printing using an aqueous low energy sublimation disperse ink. Before printing the woven fiber cloth, the cloth was heated to a temperature of 90° C., by contacting it with a heated metal plate. Then the cloth was printed, and after printing cooled to a temperature of 110° C.

The quality of the printed cloth was evaluated as excellent, the highest standard of abrasion resistance, color fastness could be obtained.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for dyeing a polymer material with an aqueous pigment or dye composition containing at least one pigment or dye dispersed therein, wherein the polymer material is a blend comprising a first polymer composition and a second polymer composition which is compatible with the first polymer composition, which second polymer composition comprises a binding agent for the at least one pigment or dye, wherein the binding agent comprises:
   a) a copolymer, wherein the copolymer has a polyolefin backbone, including a backbone of ethylene, and further comprises acrylic or methacrylic ester and maleic anhydride or an alkyl (meth)acrylate/maleic anhydride copolymer;
   b) a terpolymer; or
   c) a polymer containing amine terminated polyamide moieties, including an amine terminated polyamide;
wherein the method comprises the steps of:
   heating the polymer material to an activation temperature below the softening temperature of the polymer material,
   contacting the polymer material with the aqueous pigment or dye composition at a contact temperature for a period of time sufficient to form a pigmented or dyed polymer material,
   subjecting the pigmented or dyed polymer material to a fixation step to fixate the at least one pigment or dye therein by cooling the pigmented or dyed polymer material to a fixation temperature which is lower than the temperature at which contacting of the polymer material with the aqueous pigment or dye composition is carried out.

2. The method according to claim 1, wherein the polymer material is heated to the activation temperature simultaneously with or in advance of contacting the polymer material with the aqueous pigment or dye composition.

3. The method according to claim 1, wherein the contact temperature is a temperature which is lower than, equal to or higher than the activation temperature.

4. The method according to claim 1, wherein the fixation temperature is lower than the activation temperature.

5. The method according to claim 1, wherein the activation temperature is a temperature of at least 60° C.

6. The method according to claim 1, wherein the activation temperature is a temperature of below 150° C.

7. The method according to claim 1, wherein heating to the activation temperature is carried out using contact heat, by contacting the polymer material with at least one of steam, heated air, and heated liquid, wherein the heated liquid is heated water, by subjecting it to irradiation with a suitable energy, including UV, IR or visible light irradiation, or a combination of two or more of these techniques.

8. The method according to claim 1, wherein the fixation step is carried out by cooling the pigmented or dyed polymer material to a temperature which is at least 10° below the contact temperature.

9. The method according to claim 1, wherein the aqueous pigment or dye composition has a temperature which is a maximum 30° below the activation temperature.

10. The method according to claim 9, wherein the aqueous pigment or dye composition has a pH of between 2.0 and 12.0.

11. The method according to claim 1, wherein the polymer material is subjected to drying after having been contacted with the aqueous pigment or dye composition and in advance of being subjected to the fixation step.

12. The method according to claim 1, wherein the polymer material is contacted with the pigment or dye composition at atmospheric pressure, or a pressure above atmospheric pressure.

13. The method according to claim 12, wherein the pigment or dye composition is an aqueous dispersion of at least one ionic pigment or dye, one or more anionic pigments or dyes or one or more cationic pigments or dyes, or a mixture hereof.

14. The method according to claim 1, wherein the second polymer composition comprises the first polymer composition including polypropylene.

15. The method according to claim 1, wherein the concentration of the binding agent in the second composition is between 0.05 and 20 wt. with respect to the total weight of the polymer material.

16. The method according to claim 1, wherein the first polymer composition is a synthetic polymer material, selected from the group of a polyolefinic material, a polyester, in particular a semi aromatic polyester including polyethylene terephtalate (PET), a polybutylene terephtalate (PBT), an aliphatic polyester in particular polycaprolactone, polylactic acid, a polyamide, including an aliphatic polyamide, including nylon 6 and nylon 66, a polyphtalamide or an aramide, a polyurethane, or a mixture of two or more of these materials.

17. The method according to claim 1, wherein the first polymer composition is a polyolefin selected from the group of polyethylene, polypropylene, polybutadiene, or a blend or a copolymer of two or more of the afore-mentioned materials including polypropylene.

18. The method according to claim 1, wherein the polymer material is formed into fibers, into a foamed material, into a film or sheet or molded into an object, in advance of being contacted with the aqueous pigment or dye dispersion.

19. The method according to claim 1, wherein the copolymer comprises acrylic or methacrylic ester and maleic anhydride and further comprises glycidyl methacrylate.

20. The method according to claim 19, wherein the copolymer has a glycidyl methacrylate content of at least 7.0 wt. %.

21. The method according to claim 1 wherein the binding agent is a blend which consists essentially of the terpolymer and the polymer containing amine terminated polyamide moieties, including an amine terminated polyamide; wherein the terpolymer is selected from:
   (i) a terpolymer selected from: a first terpolymer of ethylene, acrylic or methacrylic ester and maleic anhydride having a maleic anhydride content of at least 2% by weight, or (ii) a second terpolymer of ethylene, acrylic or methacrylic ester and glycidyl methacrylate having a glycidyl methacrylate content of at least 7% by weight, and mixtures thereof.

22. The method according to claim 21, wherein the weight ratio of the terpolymer to the amine-terminated polyamide in the blend is from 3:1 to 1:1.

23. The method according to claim 1, wherein the first polymer composition comprises a biaxially oriented polypropylene with a melt flow index of maximum 45 g/10 min at 190° C. and 2.16 kg and the binding agent has a melt flow index of maximum 45 g/10 min at 190° C. and 2.16 kg.

24. The method according to claim 1, wherein the concentration of the binding agent in the second polymer composition is between 0.05 and 15 wt. % with respect to the total weight of the polymer composition.

25. The method according to claim 1, wherein the polymer material is a woven or non-woven sheet material of fibers, which fibers are made of a polymer material comprising the first polymer composition comprising polypropylene and the second polymer composition comprising the binding agent.

26. A method for producing a printed polymer sheet material, the method comprising the steps of producing a polymer sheet material by blending a first polymer composition and a second polymer composition comprising a binding agent, wherein the binding agent comprises:
   a) a copolymer, wherein the copolymer has a polyolefin backbone, including a backbone of ethylene, and further comprises acrylic or methacrylic ester and maleic anhydride or an alkyl (meth)acrylate/maleic anhydride copolymer;
   b) a terpolymer; or
   c) a polymer containing amine terminated polyamide moieties, including an amine terminated polyamide;

followed by
   heating the polymer sheet material to an activation temperature below the softening temperature of the polymer material,
   contacting the polymer sheet material with an aqueous pigment or dye composition and applying a printed image at a contact temperature,
   subjecting the printed polymer sheet material to a fixation step to fixate at least one pigment or dye therein by cooling the printed polymer material to a fixation temperature which is lower than the temperature at which contacting of the polymer material with the aqueous pigment or dye composition is carried out.

27. The method according to claim 1, wherein the polymer material is subjected to co-extrusion of a multi-layer sheet comprising at least a first layer comprising the first polymer composition and a second layer comprising the second polymer composition comprising the binding agent.

28. The method according to claim 27, wherein the side of the multi-layer sheet comprising the second polymer composition, is printed with a printed image.

29. The method according to claim 27, wherein printing comprises the steps of :
   heating the multi-layer sheet to an activation temperature below the softening temperature of the polymer material,
   printing a side of the multi-layer sheet comprising the second polymer composition at a printing temperature which is at least the contact temperature,
   subjecting the printed polymer material to a fixation step to fixate the at least one pigment or dye therein by cooling the printed multi-layer sheet to a fixation temperature which is lower than the printing temperature.

30. The method according to claim 27, wherein a face of the polymer sheet material is printed, which contains the second polymer composition.

* * * * *